Dec. 26, 1922.
S. COOPER.
METHOD AND APPARATUS FOR CRACKING NUTS.
FILED APR. 4, 1919.
1,439,694.
4 SHEETS—SHEET 1.
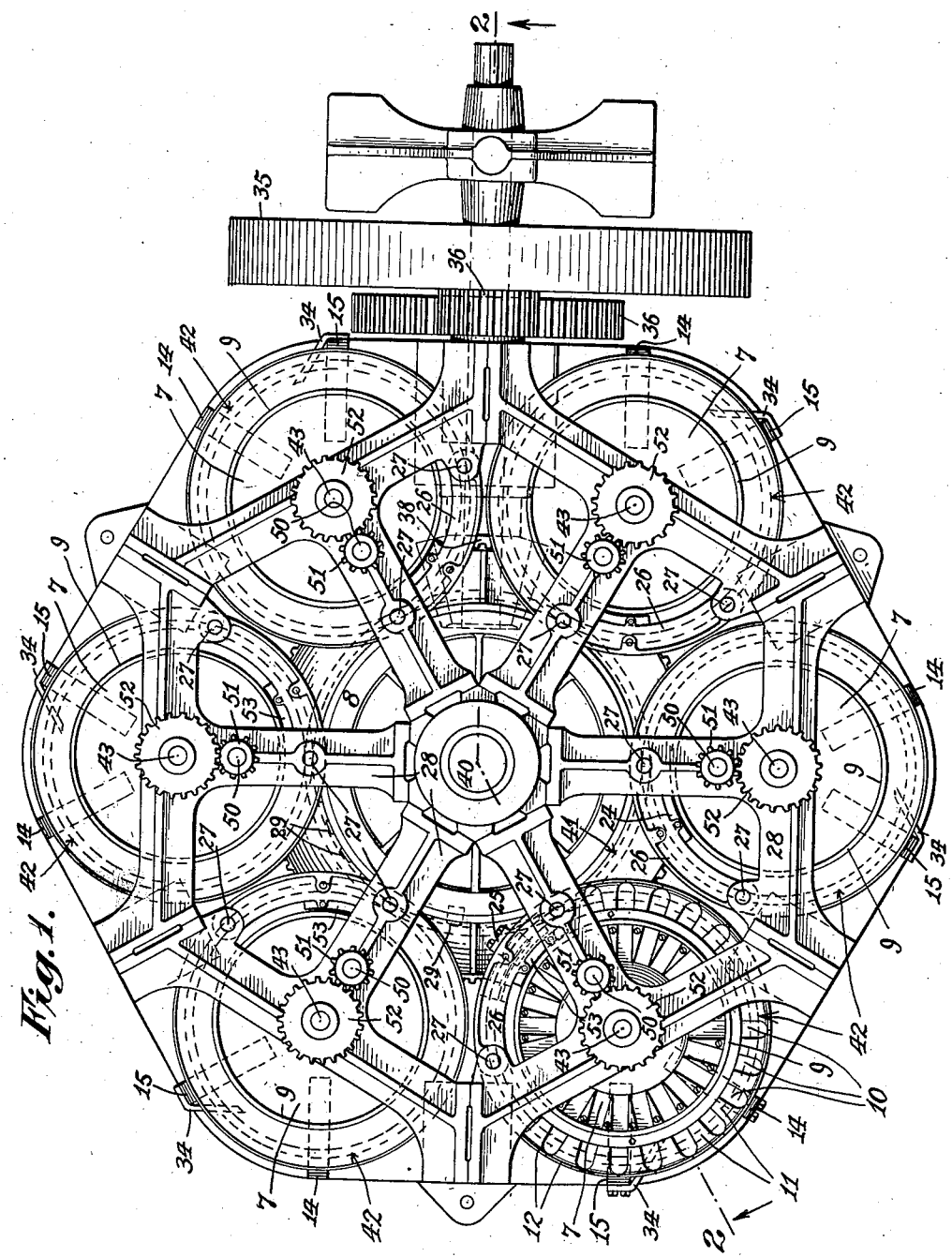

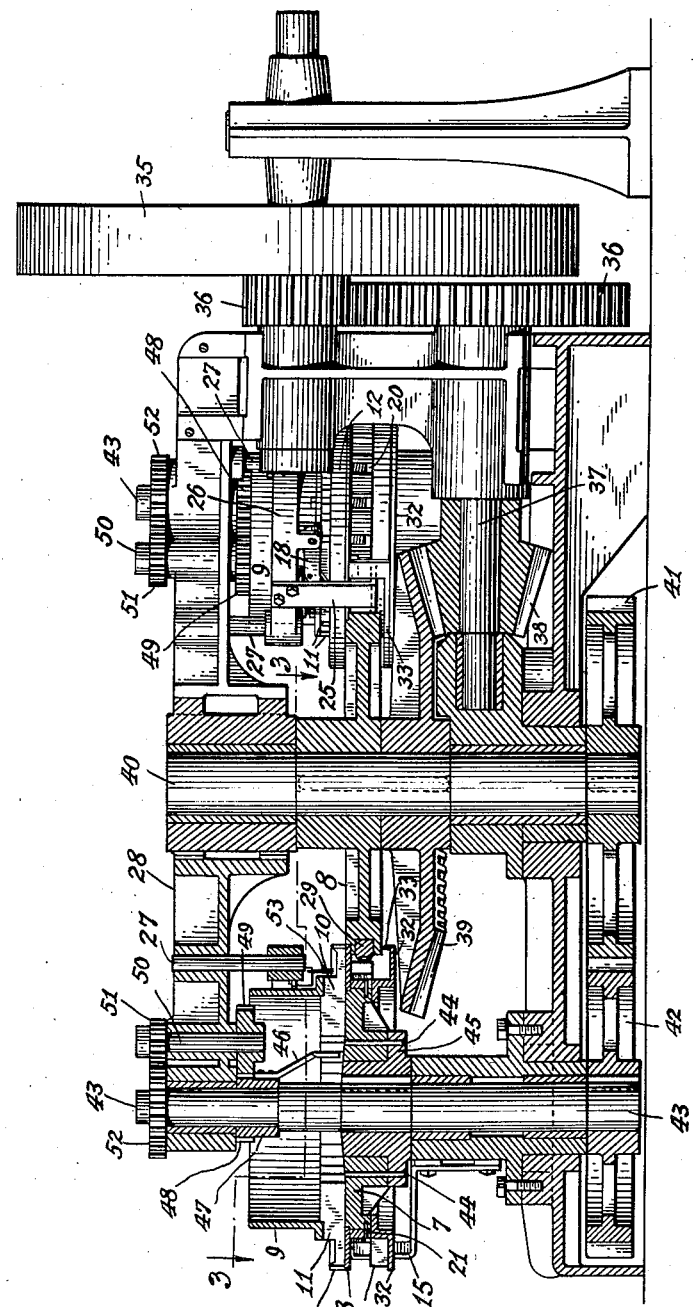

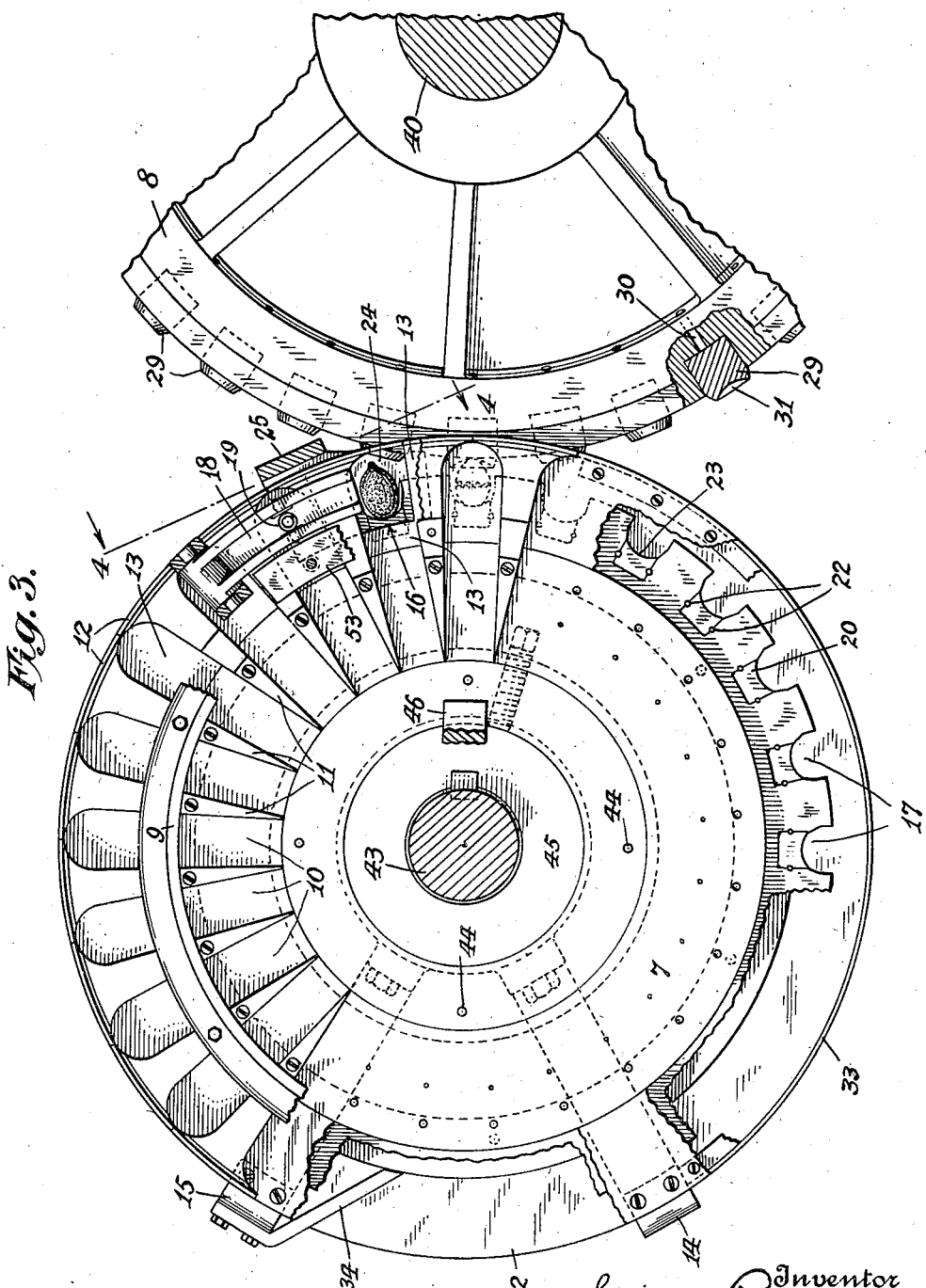

Dec. 26, 1922.
S. COOPER.
METHOD AND APPARATUS FOR CRACKING NUTS.
FILED APR. 4, 1919.
1,439,694.
4 SHEETS—SHEET 4.
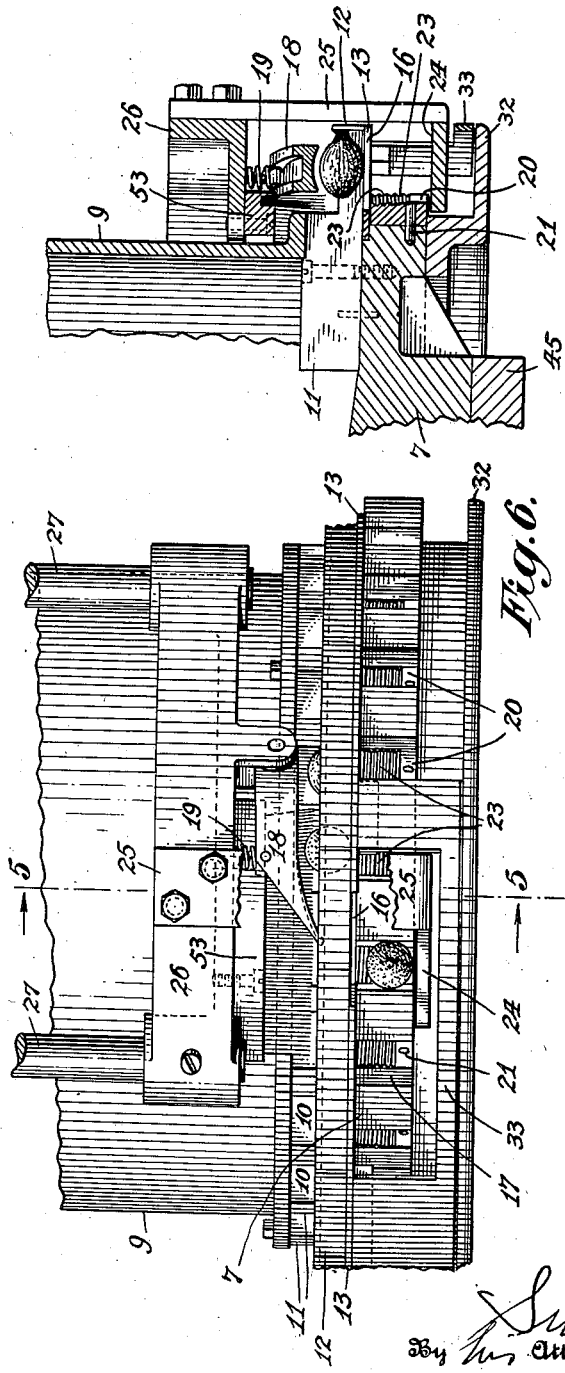
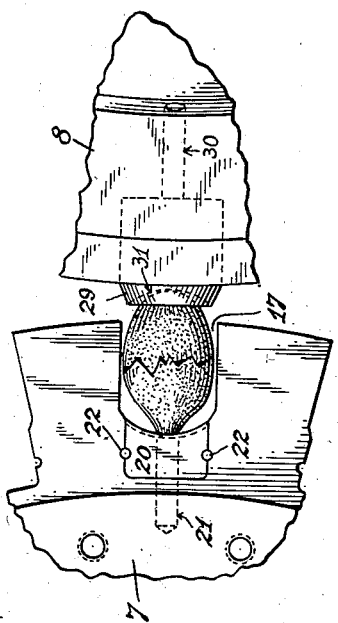

Patented Dec. 26, 1922.

1,439,694

UNITED STATES PATENT OFFICE.

SIMON COOPER, OF NEW YORK, N. Y., ASSIGNOR TO THE FRANKLIN BAKER COMPANY, OF PHILADELPHIA, PENNSYLVANIA, A CORPORATION OF PENNSYLVANIA.

METHOD AND APPARATUS FOR CRACKING NUTS.

Application filed April 4, 1919. Serial No. 287,459.

*To all whom it may concern:*

Be it known that I, SIMON COOPER, a citizen of the United States, residing at New York, in the county of New York and State of New York, have invented certain new and useful Improvements in Methods and Apparatus for Cracking Nuts, of which the following is a specification.

The objects of my present invention are to provide simple and effective means for cracking nuts in quantity.

Stated generally, the invention resides in a combination of cooperating members rotating in substantially coincident arcs and arranged in their rotation to apply crushing pressure endwise of the nuts. The nuts are positioned in pockets provided in one of the members and usually there are provided a plurality of these so-called "carrier" members grouped about and cooperating with a common "anvil" member.

Various other features and details of the invention will appear as the specification proceeds.

The accompanying drawings illustrate the invention embodied in a practical commercial form but it will be understood that the form of the mechanism may vary without departure from the true spirit and scope of the invention.

In said drawings, Figure 1 is a plan view of a machine constructed with six cracking units; Figure 2 is a vertical sectional view taken substantially on the plane of line 2—2 of Figure 1; Figure 3 is an enlarged sectional view on substantially the plane of line 3—3 of Figure 2 and showing only one of the cracking units; Figure 4 is a broken side elevation of one of the cracking units, looking in the direction of arrows 4—4 in Figure 3; Figure 5 is a vertical sectional view on substantially the line 5—5 of Figure 4; Figure 6 is an enlarged broken view illustrating the crushing effect exerted by the cooperating rotating members.

The machine illustrated is of a multi-unit type, embodying a plurality of cracking pairs made up of a series of carrier wheels 7, (six in number, Figure 1) grouped symmetrically about and cooperating each with a centrally located cracking wheel 8.

The carrier wheels are each provided with a hopper 9, into which the nuts are supplied. These hoppers have radial outlet ducts 10 in the bottom thereof, formed in the present instance by the spaced inwardly tapered radially extending fingers 11, which are provided at their outer ends with the cooperating angular extensions 12, which serve to close the outer ends of the ducts. The ducts extend beyond the rims of the hoppers as shown most clearly in Figures 2 and 5 and the nuts which lie in the outer extended ends of these ducts are supported for a portion of their travel by a relatively stationary shelf 13, mounted on brackets 14, 15 beneath the extended portions of the ducts, which as shown, are open at the bottom. At a point in advance of where the carrier and anvil wheels cooperate to exert their crushing pressure upon the nuts, the supporting shelf is provided with a discharge opening 16, in line with the extended outer ends of the radial ducts and through which the nuts fall into pockets 17 provided in the carrier wheel beneath the shelf 13 and substantially in line with the ducts. This transfer of the nuts is facilitated by a pusher 18, overlying the open outer ends of the ducts (Figures 4 and 5) and acted on by a spring 19, to thrust the nuts downward out of said ducts and through the discharge opening into the cracking pockets.

The cracking pockets are located in the rim portion of the carrier wheel and are substantially U-shaped, extending radially of the wheel, with the open ends outward (Figures 3 and 6). The bottoms or backs of these pockets are usually faced with a hard metal-ware piece 20, which may be detachably held in its seat as by means of a supporting pin 21 and dowels 22. This provides for ready replacement of those parts which are subjected to most wear and enables the substituting of different shapes and sizes of parts to accommodate nuts of different kinds and sizes. The working face of these inserts are shown as roughened or corrugated at 23 for the purpose of gripping and holding the inner ends of the nuts during the cracking process.

Extended beneath the cracking pockets and in line with the discharge opening in the supporting shelf, there is shown provided a table or shelf 24 for supporting the nuts just prior to the time they are caught and pinched between the cooperating wheels. This table is shown carried by a strap 25, dependent from the bracket 26 which is supported from posts 27, dependent from the main frame 28, of the machine (Figures 1 and 2). Bracket 26 is also here used as a support for the transfer device 18.

The centrally disposed cracking wheel 8 is provided on its rim portion with a series of anvil elements 29 adapted to register with the pockets in the surrounding carrier wheels, said anvils being shown as hard metal inserts seated in the rim of the wheel and detachable therefrom by means of drive pins inserted through passages 30 provided at the backs of such inserts. This provides for ready replacement for repairs and for operation on different kinds of nuts. These anvils are shown as cupped or concaved on their outer working faces at 31, so as to grip and hold the outer ends of the nuts seated in the carrier wheels.

The nut cracking elements on the cooperating anvil and carrier wheels rotate on approaching and substantially coincident arcs, as indicated in Figures 1, 3 and 6, and at substantially equal speed so that the nuts in the radial pockets are first gripped and then pinched and crushed endwise between the rotating bodies. The shells are, by these means, crushed without injuring the kernels, lateral expansion of the shells in the rupturing thereof, being provided for by making the nut-receiving pockets somewhat wider than necessary to contain the nuts, as shown in Figure 6.

In the continued rotation of the rotary members, the nuts drop from between the cooperating cracking elements onto a shelf 32 forming a part of the carrier wheel and disposed beneath the pockets and beneath the temporary supporting table 24. A relatively stationary guard rim 33 extends around a portion of the periphery of the rotary shelf 32, to hold the cracked nuts thereon. At the outermost portion of each carrier wheel, this guard rim is discontinued, as shown in Figure 3, and over such unguarded portion of the outstanding shelf or flange 32, a deflector blade 34 is extended to sweep the cracked nuts off into a basket or other collection receptacle.

The various parts of the machine are driven by suitable gearing. In the illustration, power is applied to a pulley 35, which is connected by gears 36 with a shaft 37, carrying a bevel pinion 38 in mesh with a bevel gear 39 on a centrally located shaft 40, which latter shaft through a gear 41, meshing with gears 42 on shafts 43, providing a common drive for all the several cracking units. This common drive shaft carries the anvil wheel and the shafts 43, carry the carrier wheels with their hoppers. To guard against injury to the more important parts, the carrier members are shown connected by shear pins 44 with the drive bushings 45 which are keyed fast to the shafts 43, said pins being designed to give way in the event of too great a strain or load being placed upon the machine.

Feeding of the nuts into the radial channels in the hopper is facilitated by an agitator 46, carried by a collar 47 sleeved on the carrier shaft and provided with a gear 48 in mesh with a gear 49 on the lower end of a short stub shaft 50, which carries at its upper end a gear 51 in mesh with a drive gear 52 on the upper end of the carrier shaft.

To prevent crowding of the nuts in the outer ends of the channels and the riding of one nut over the other, I have provided, in the machine shown, a hold back device, in the form of a brush 53 disposed adjacent the outer ends of the channels in position to engage and hold back the nuts in rear of the outermost nut in each channel.

I claim:—

1. In a machine of the character described, a carrying wheel and a cracking wheel rotating in substantially tangential arcs, one of said wheels having radially extending open-ended nut-containing pockets in the rim portion thereof and the other wheel having anvils on the rim portion thereof registering with the pockets and positioned to effect an endwise cracking of the nuts in the pockets in the rotation of the wheels.

2. In a machine of the character described, a carrying wheel and a cracking wheel rotating in substantially tangential arcs, one of said wheels having radially extending open-ended nut-containing pockets in the rim portion thereof and the other wheel having anvils on the rim portion thereof registering with the pockets and positioned to effect endwise cracking of the nuts in the pockets in the rotation of the wheels, and means for placing nuts in the pockets aforesaid.

3. In a machine of the character described, a rotating carrier having radially extending open-ended pockets in the rim thereof and a cooperating rotating cracking member having anvils registering with the open pockets in the carrier.

4. In combination, a carrying member having radially extending nut receiving pockets, a cracking member provided with abutments and means for traversing the members with the abutments of the cracking member registering with the pockets of the carrying member at a predetermined point in their movements to thereby effect an endwise cracking of nuts in the pockets of said carrying member.

5. In combination, a carrier having radially extending open-ended U-shaped pockets in the rim thereof and a cracking member provided with anvils having concave operative faces registering with the open-ended pockets of the carrier.

6. In combination, a carrier having radially extending open-ended U-shaped pockets in the rim thereof and a cracking member provided with anvils having concave operative faces registering with the open-ended pockets of the carrier, said anvils being detachably mounted in said cracking member.

7. In combination, a carrier having radially extending open-ended U-shaped pockets in the rim thereof and a cracking member provided with anvils having concave operative faces registering with the open-ended pockets of the carrier, the carrier member having detachable wear pieces in the pockets thereof.

8. In combination, a travelling carrier having nut pockets provided with detachable wear pieces, and a simultaneously moving cracking member having anvil elements arranged for registration with said pockets at a predetermined point in the travel of the carrier and the cracking member.

9. In combination, a travelling carrier having nut pockets provided with roughened walls to grip nuts placed in said pockets, and a simultaneously moving cracking member having anvil elements arranged for registration with said pockets at a predetermined point in the travel of the carrier and the cracking member.

10. In combination, a movable carrier having nut pockets open at their outer ends and corrugated at their inner ends to grip the inner ends of nuts seated in said pockets and a simultaneously moving cracking member having anvils arranged for registration with said pockets and concaved to receive and hold the outer ends of the nuts in such pockets at a predetermined point of movement of the carrier and the cracking member.

11. In a nut cracking machine, a cracking wheel and a plurality of nut-carrying wheels grouped about and cooperating with said cracking wheel.

12. In a nut cracking machine, a cracking wheel provided with a plurality of anvils and a plurality of wheels grouped about said cracking wheel and provided with nut-holding pockets registering with said anvils.

13. In a nut cracking machine, a cracking wheel provided with a plurality of anvils and a plurality of wheels grouped about said cracking wheel and provided with nut-holding pockets registering with said anvils, and means for supplying nuts to the pockets in said carrier wheels.

14. In a nut cracking machine, a cracking wheel provided with a plurality of anvils and a plurality of wheels grouped about said cracking wheel and provided with nut-holding pockets registering with said anvils, each of the carrier wheels having a hopper and means for feeding nuts from said hopper into the pockets aforesaid.

15. In combination, a hopper, a carrier provided with nut-receiving pockets, means for feeding nuts from the hopper into said pockets and travelling anvils registering with the pockets and arranged to operate on the nuts seated therein.

16. In combination, a hopper provided with radial discharge passages, a carrier having pockets to register with said passages and to receive nuts therefrom and a member having cracking elements to cooperate with the pockets of said carrier.

17. In combination, a hopper provided with radial discharge passages, a carrier having pockets to register with said passages and to receive nuts therefrom, means for shifting the nuts from the passages into said pockets, and a member having cracking elements to cooperate with the pockets of said carrier.

18. In a machine of the character described, a hopper having radial outlet passages in the bottom thereof, means for shifting nuts outward into said passages, and means for holding back the nuts in rear of the outermost nuts in said passages.

19. In combination, a rotary hopper having radial outlet passages in the bottom thereof, a supporting shelf beneath the outer portions of said passages and provided with a discharge opening, a carrier having nut-receiving pockets registering with said discharge opening, and nut-cracking elements cooperating with said pockets.

20. In combination, a rotary hopper having radial outlet passages in the bottom thereof, a supporting shelf beneath the outer portions of said passages and provided with a discharge opening, a carrier having nut-cracking pockets registering with said discharge opening, means for automatically transferring nuts in the passages through said discharge opening into the pockets, and nut-cracking elements cooperating with said pockets.

21. In combination, a rotary hopper having radial outlet passages in the bottom thereof, a supporting shelf beneath the outer portions of said passages and provided with a discharge opening, a carrier having nut-cracking pockets registering with said discharge opening, a support beneath the nut-receiving pockets at a point in line with the discharge opening, and nut-cracking elements cooperating with said pockets.

22. In combination, a rotary hopper having radial outlet passages in the bottom thereof, a supporting shelf beneath the outer portions of said passages and provided with a discharge opening, a carrier having nut-cracking pockets registering with said discharge opening, a support beneath the nut-receiving pockets at a point in line with the discharge opening, nut-cracking elements cooperating with said pockets, and a supporting shelf for the cracked nuts beneath the nut pockets of the carrier.

23. In combination, a rotary hopper having radial outlet passages in the bottom thereof, a supporting shelf beneath the outer portions of said passages and provided with a discharge opening, a carrier having nut-cracking pockets registering with said discharge opening, a support beneath the nut-receiving pockets at a point in line with the discharge opening, nut-cracking elements cooperating with said pockets, a supporting shelf for the cracked nuts beneath the nut pockets of the carrier, and means for discharging the cracked nuts off said shelf.

24. In combination, a rotary hopper having radial outlet passages closed at their outer ends but open at the bottom, a stationary supporting shelf beneath said open-bottom passages and provided with a discharge opening and a carrier wheel rotating with the hopper and having pockets beneath the shelf and traversing the discharge opening therein.

25. In combination, a rotary hopper having radial outlet passages closed at their outer ends but open at the bottom, a stationary supporting shelf beneath said open-bottom passages and provided with a discharge opening and a carrier wheel rotating with the hopper and having pockets beneath the shelf and traversing the discharge opening therein, a supporting shelf carried by the carrier wheel beneath the pockets, a relatively stationary confining rim about a portion of said latter shelf and deflecting means extending over an unguarded portion of said shelf.

26. In combination, a cracking wheel provided with anvils on the rim thereof, carrier wheels grouped about the cracking wheels and provided with nut-receiving pockets registering with said anvils, hoppers associated with the carrier wheels and means for feeding nuts from said hoppers into the pockets in position to be operated upon by the anvils.

27. In a nut-cracking machine, cooperating cracking members rotating in substantially tangential arcs and one having pockets to hold the nuts aligned radially of such member and the other having anvil elements registering with said pockets to apply pressure endwise to the nuts seated in said pockets.

28. In a nut-cracking machine, cooperating opposed rotary cracking members and means for driving the same including a gear connection.

29. In a nut-cracking machine, cooperating carrier and cracking wheels and means for positioning the nuts on the carrier member with their longitudinal axes disposed radially of said members.

30. A combination like that referred to in claim 29 wherein the means referred to includes radial nut-receiving pockets in the carrier wheel and devices for feeding the nuts one at a time into said pockets.

31. In a nut-cracking machine, a rotary member having a series of radial channels and a series of radial pockets and means for transferring nuts from said channels into said pockets.

32. In a nut-cracking machine, cooperating carrier and anvil wheels, said carrier wheel having pockets forming backings for nuts seated therein and said anvil wheel having cupped elements registering with the pockets to thereby center the nuts in the pockets.

33. A combination like that of claim 32, wherein the pockets are constructed to position the nuts but to allow free expansion on the cracking thereof.

34. In a nut-cracking machine, a rotary hopper, provided with radial outlet channels and an agitator for feeding nuts in said hopper into said radial channels.

35. In a nut-cracking machine, carrier wheels provided with nut-receiving pockets and a rotary cracking member common to said carrier wheels and provided with means to grasp the nuts in the pockets and to apply cracking pressure thereto.

36. In a nut-cracking machine, a central drive shaft, a rotary cracking member carried thereby, carrier shafts grouped about said central drive shaft, driving gearing from the central drive shaft to the surrounding carrier shafts and carrier wheels on said carrier shafts provided with nut-receiving pockets opposed to the cracking members.

In testimony whereof I affix my signature.
SIMON COOPER.